United States Patent
Hattori et al.

[11] Patent Number: 5,941,302
[45] Date of Patent: Aug. 24, 1999

[54] CERAMIC SHELL-AND-TUBE TYPE HEAT EXCHANGER AND METHOD FOR MANUFACTURING THE SAME

[75] Inventors: Mitsuru Hattori, Ama-gun; Yoshinobu Goto, Nagoya, both of Japan

[73] Assignee: NGK Insulators, Ltd., Nagoya, Japan

[21] Appl. No.: 08/812,710

[22] Filed: Mar. 6, 1997

[30] Foreign Application Priority Data

Mar. 25, 1996 [JP] Japan .................................. 8-067869

[51] Int. Cl.⁶ ...................................................... F28D 1/04
[52] U.S. Cl. .......................... 165/151; 165/905; 165/159; 156/89
[58] Field of Search .................................. 165/905, 151, 165/159; 156/89

[56] References Cited

U.S. PATENT DOCUMENTS

| | | | |
|---|---|---|---|
| 3,112,184 | 11/1963 | Hollenbach | 165/905 |
| 4,222,434 | 9/1980 | Clyde | 165/905 |
| 4,437,217 | 3/1984 | Lallaye et al. | 165/905 |
| 4,545,429 | 10/1985 | Place, Jr. et al. | 165/905 |
| 4,582,126 | 4/1986 | Corey | 165/905 |
| 4,688,629 | 8/1987 | Kohnken | 165/905 |
| 4,768,586 | 9/1988 | Berneburg et al. | 165/905 |
| 4,787,443 | 11/1988 | Fukatsu et al. | 165/905 |
| 4,867,233 | 9/1989 | Gemeinhardt | 165/905 |
| 5,238,057 | 8/1993 | Schelter et al. | |
| 5,655,600 | 8/1997 | Dewar et al. | 165/905 |

FOREIGN PATENT DOCUMENTS

| | | |
|---|---|---|
| 0 410 247 A2 | 1/1991 | European Pat. Off. |
| 0 479 657 A1 | 4/1992 | European Pat. Off. |
| 195 11 237 A1 | 10/1995 | Germany |

Primary Examiner—James C. Yeung
Assistant Examiner—Terrell McKinnon
Attorney, Agent, or Firm—Kubovcik & Kubovcik

[57] ABSTRACT

A method for manufacturing a ceramic shell-and tube type heat exchanger provided with fins includes the steps of: inserting heat transfer tubes of sintered tubular ceramic into throughholes of tubular plates of unsintered plate-like ceramic each having a plurality of the throughholes for fixing the heat transfer tubes inserted thereinto; standing the heat transfer tubes vertically to a floor surface; positioning the tubular plates at both the upper and lower end portions of the heat transfer tubes; disposing between the tubular plates many fin plates of unsintered ceramic so as to pile up the fin plates in the direction of a length of the heat transfer tubes, each of the fin plates including a thin plate having a plurality of throughholes for fixing the heat transfer tubes inserted thereinto, and protrusions formed on both edge portions of the thin plate; firing the components so as to unitarily join them by the utilization of differences of firing shrinkage ratios among the heat transfer tubes, the tubular plates, and the fin plates; and removing the protrusions from the fin plates.

6 Claims, 8 Drawing Sheets

CERAMIC SHELL-AND-TUBE TYPE HEAT EXCHANGER AND METHOD FOR MANUFACTURING THE SAME

BACKGROUND OF THE INVENTION AND RELATED ART STATEMENT

The present invention relates to a ceramic shell-and-tube type heat exchanger and a method for manufacturing the same.

Nowadays, the research and development of a forward type ceramic gas turbine have been carried out as a government project for the purposes of achieving high efficiency, low environmental pollution, the diversification of fuel, and the like. Thus, as one of factor devices of this ceramic gas turbine, a heat exchanger made of a ceramic material having an excellent performance as a heat-resistant material for high temperatures has been developed in place of conventional metallic materials. FIG. 11 shows a schematic side view illustrating a ceramic shell-and-tube type heat exchanger which has been heretofore developed. In this drawing, two tubular plates 1a, 1b are joined and fixed to both the end portions of a plurality of heat transfer tubes 2 which are tubular ceramics, and the above-mentioned two tubular plates 1a, 1b are plate-like ceramics having a plurality of through-holes into which these heat transfer tubes 2 are inserted to be fixed.

As a general method for preparing a ceramic shell-and-tube type heat exchanger, there is known a method which comprises: inserting the end portions of the heat transfer tubes which are the sintered tubular ceramics into throughholes of tubular plates 1 which are unsintered plate-like ceramics having the plurality of throughholes 3 as shown in FIG. 7, and then firing these members in this condition, thereby integrally joining both the members to each other by the utilization of a difference between firing shrinkage ratios of both the members (this joining technique utilizing the difference between the firing shrinkage ratios will be hereinafter referred to as "firing join").

That is, since the heat transfer tubes are already sintered, they hardly shrink during the firing process; while since the tubular plates are unsintered, the tubular plates have a higher shrinkage ratio than the heat transfer tubes. When firing is conducted under the aforementioned conditions, both ends of each heat transfer tube are tightened by a shrinkage of throughholes 3 in the tubular plates 1 according to the sintering, thereby unitarily joining the tubular plates 1 with the heat transfer tubes. An adequate interference of the firing join is determined in consideration of firing shrinkage ratios of the tubular plates and the heat transfer tubes, thereby providing more strong connecting conditions.

In this case, the firing can usually be carried out in such a condition as shown in FIG. 10 where in a sagger having a sealed structure for the purposes of preventing contamination with carbon and the like from furnace materials and of regulating an atmosphere, a setter 4 is placed, the heat transfer tubes 2 are stood on this setter 4 so as to be vertical to a floor surface, and the tubular plates 1a, 1b are positioned at both the upper and lower end portions of the tubes 2 by the use of jigs 5.

However, in the above-mentioned conventional manufacturing method, the heat transfer tubes tend to be deformed during the firing join step. Therefore, joining strength between the heat transfer tubes and the tubular plates tends to deteriorate, and gas leakage is inconveniently liable to occur owing to a joining failure between the heat transfer tubes and the tubular plates. When the heat transfer tubes are long, the heat transfer tubes are further noticeably deformed. Accordingly, it has particularly been difficult to manufacture the ceramic shell-and-tube type heat exchanger having the long heat transfer tubes.

As a means for controlling the deformation of the heat transfer tubes in a firing and joining process, the present inventor previously proposed that another tubular plate (middle tubular plate) 1c is placed between the two tubular plates 1a and 1c which were positioned at the upper and lower end portions of the heat transfer tubes as shown in FIG. 9 and that they are fired and joined simultaneously with supporting these tubular plates by a fixing jig 5 (U.S. patent application Ser. No. 08/411,261). Since, the heat transfer tubes 2 were bound in the middle portions by the middle tubular plate 1c in this method, it had a certain effect of controlling the deformations of the heat transfer tubes. However, it was not necessarily satisfied, and therefore, a more effective method was required.

Additionally, in a heat exchanger, it is the most important technical subject to improve its heat exchange efficiency. As one of the means, it is very effective to form fins on the heat transfer tubes, thereby enlarging a heat transfer area of the heat exchanger.

The present invention has been attained in view of such conventional circumstances. An object of the present invention is to provide a method for manufacturing a ceramic shell-and-tube type heat exchanger provided with fins, which can prevent the deformation of heat transfer tubes and simultaneously form fins of heat transfer tubes in a firing join step.

SUMMARY OF THE INVENTION

According to the present invention, there is provided a method for manufacturing a ceramic shell-and tube type heat exchanger provided with fins, comprising the steps of:

inserting heat transfer tubes of sintered tubular ceramic into throughholes of tubular plates of unsintered plate-like ceramic each having a plurality of the throughholes for fixing the heat transfer tubes inserted thereinto;

standing the heat transfer tubes vertically to a floor surface;

positioning the tubular plates at both the upper and lower end portions of the heat transfer tubes;

disposing between the tubular plates many fin plates of unsintered ceramic so as to pile up the fin plates in the direction of a length of the heat transfer tubes, each of the fin plates comprising: a thin plate having a plurality of throughholes for fixing the heat transfer tubes inserted thereinto, and protrusions formed on the both edge portions of the thin plate;

firing them so as to unitarily join them by the utilization of differences of firing shrinkage ratios among the heat transfer tubes, the tubular plates, and the fin plates; and removing the protrusions from the fin plates.

Incidentally, in the present invention, the unsintered ceramic means a molded article (a green ware) or a calcined article (a calcined ware) of the ceramics.

According to the present invention, there is further provided a ceramic shell-and-tube type heat exchanger comprising:

a plurality of heat transfer tubes of sintered tubular ceramic;

two tubular plates of unsintered ceramic having a plate-like shape and having a plurality of throughholes into which the heat transfer tubes are inserted to be fixed at both of the upper and lower ends of the heat transfer tubes; and fins disposed between the two tubular plates and fixedly Joined with the heat transfer tubes, each of the fins having a thin plate-like shape having a plurality of throughholes into which the heat transfer tubes are inserted to be fixed.

BRIEF DESCRIPTION OF THE DRAWINGS

FIG. 3A is a plan view, and FIG. 3B is a cross-sectional view.

DETAILED DESCRIPTION OF THE PREFERRED EMBODIMENT

In a manufacturing method of the present invention, a plurality of fin plates are piled up to be disposed in the direction of a length of the heat transfer tubes between the tubular plate positioned at the upper end portions of heat transfer tubes (hereinafter referred to as "an upper tubular plate") and the tubular plate positioned at the lower end positions (hereinafter referred to as "a lower tubular plate") of the heat transfer tubes, whereby the deformation of the heat transfer tubes in a firing join step can be prevented, with the result that a heat exchanger having excellent shape accuracy can be obtained. Additionally, protrusions of the fin plates are removed so as to obtain a heat exchanger having many fins formed on the heat transfer tubes and having a wide heat transfer area, thereby obtaining a high heat exchange efficiency.

The present invention is hereinbelow described in detail with reference to the drawings.

Figure 1:
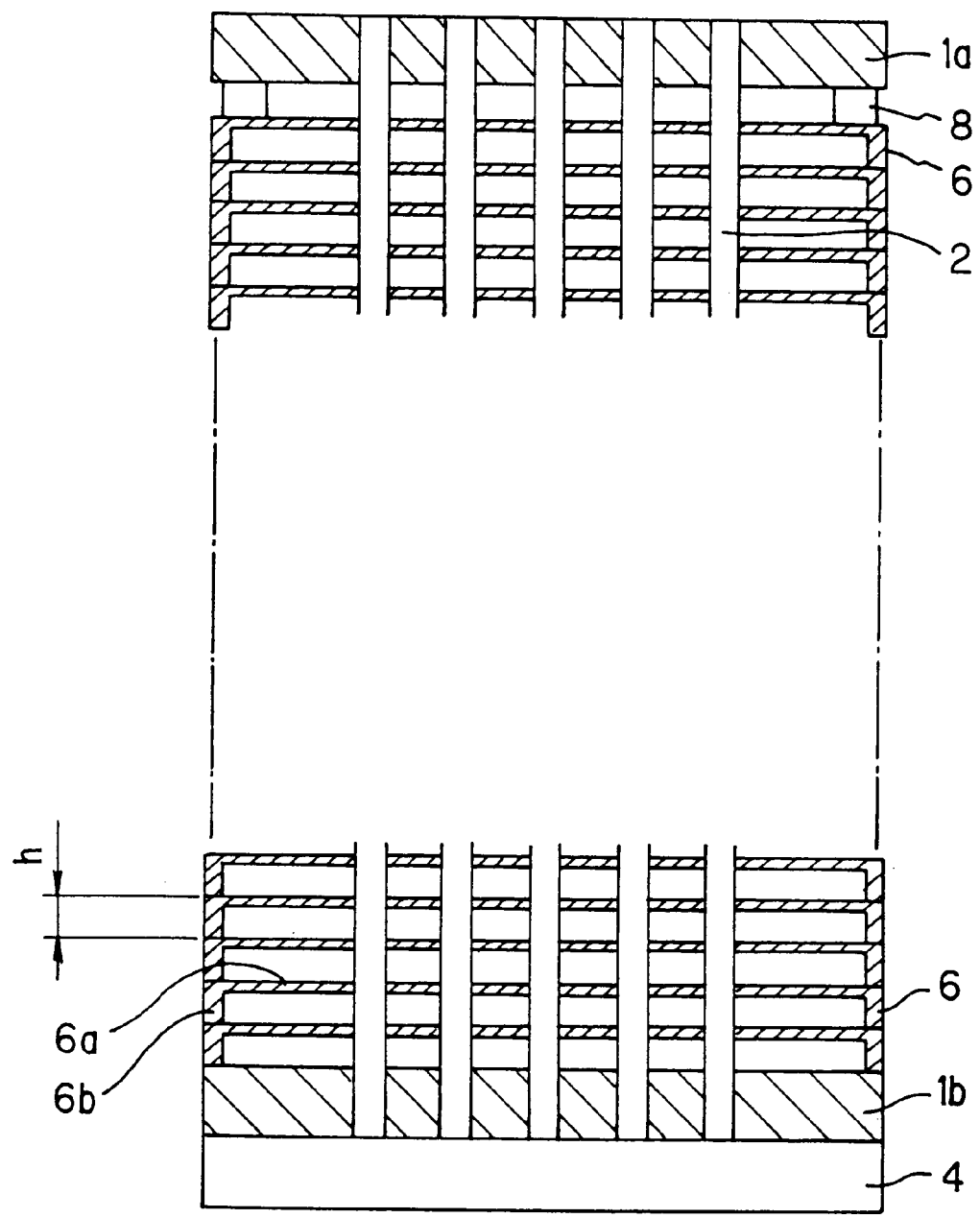
FIG. 1 is an illustrative view showing an embodiment of a method for manufacturing a ceramic shell-and-tube type heat exchanger of the present invention.

FIG. 1 is an illustrative view showing an embodiment of a manufacturing method of the present invention. Each of heat transfer tubes 2 which are sintered tubular ceramics is inserted into each of the throughholes of tubular plates 1a and 1b. The upper tubular plate 1a and the lower tubular plate 1b are positioned at the upper end portion and at the lower end portion, respectively, of the heat transfer tubes 2 which are vertically stood on a setter 4. Simultaneously, many fin plates 6 are disposed to be piled up between the upper tubular plate 1a and the lower tubular plate 1b in a direction of length of the heat transfer tubes 2.

Each of the fin plates 6 is of unsintered ceramic like a tubular plate. As shown in the plan view of FIG. 3A and the cross-sectional view of FIG. 3B, each of the fin plates 6 comprises a thin plate 6a for supporting a heat transfer tube having a plurality of throughholes 7 for fixing heat transfer tubes inserted thereinto and protrusions 6b formed on the both edge portions of the thin plate 6a for supporting the heat transfer tubes so as to be perpendicular to the thin plate 6a. When such fin plates 6 are piled up as shown in FIG. 1, spaces with a predetermined pitch are formed between the thin plates 6a of adjacent fin plates 6.

The pitch between thin plates 6a of adjacent fin plates depends on the height h of the protrusions 6b. The thin plates 6a function as fins for enlarging a heat transfer area of the outside of the heat transfer tubes when heat exchange is accomplished by a method of the present invention. The number of fin plates 6 is determined by the number of fin plates required to obtain the aimed heat transfer area. A height h of protrusions 6b is determined in consideration of the number of fin plates 6 and a length of heat transfer tube 2, and the like. Though a thickness of a thin plate 6a is not particularly limited, the thickness is preferably about 0.5–3 mm.

Tubular plates 1a and 1b and fin plates 6, all of which are unsintered ceramic having a high firing shrinkage ratio tighten the heat transfer tubes 2 in throughholes of the plates by firing under the state shown in FIG. 1, thereby joining the heat transfer tube 2 with the tubular plates 1a and 1b and the fin plates 6. The heat transfer tubes 2 are connected with the plates by firing under the state that the tubes 2 are inserted into the throughholes of each of the many fin plates 6 which are piled up. Accordingly, movement of the heat transfer tubes 2 is controlled by the throughholes of each fin plate 6, and deformation of the heat transfer tubes 2 during firing and joining can be controlled. When the method of the present invention is compared with the aforementioned method in which an intermediate tubular plate is used (U.S. patent application Ser. No. 08/411,261), the heat transfer tubes 2 are bound by many fin plates 6 with narrower spaces and in more positions. Therefore, the effect of controlling deformation of the heat transfer tubes is higher.

Figure 4:
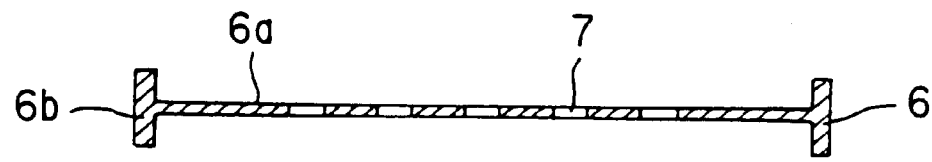
FIG. 4 is a cross-sectional view showing an embodiment of a fin plate.

Incidentally, in the embodiment shown in FIG. 1, spacers 8 are positioned between the uppermost fin plate 6 and the upper tubular plate 1a so as to secure a predetermined space therebetween. Alternatively, a fin plate 6 having protrusions 6b in both the upper and lower direction as shown in FIG. 4 may be used for securing the predetermined space.

In the present invention, the upper and lower tubular plates 1a and 1b are supported by fin plates 6 piled up on the lower tubular plate 1b so as to disposed between the upper and lower tubular plates 1a and 1b and positioned in a predetermined position of the heat transfer tubes 2. Accordingly, a jig for supporting and positioning the tubular plates is not required, and the positioning is easily performed.

Figure 3:
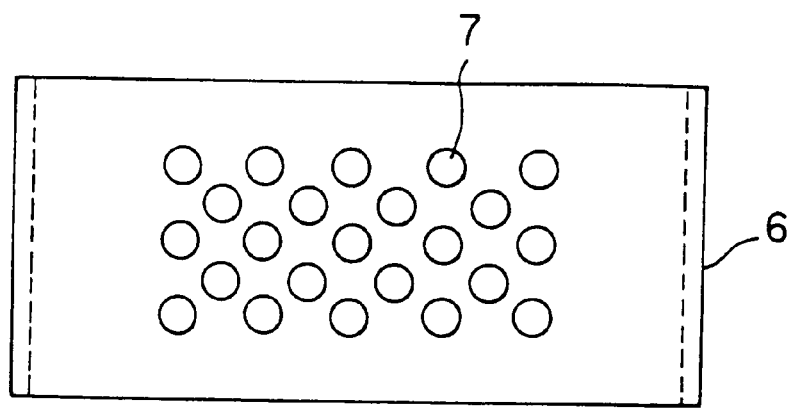
FIGS. 3A and 3B are illustrative views showing an embodiment of a fin plate.
Figure 3:
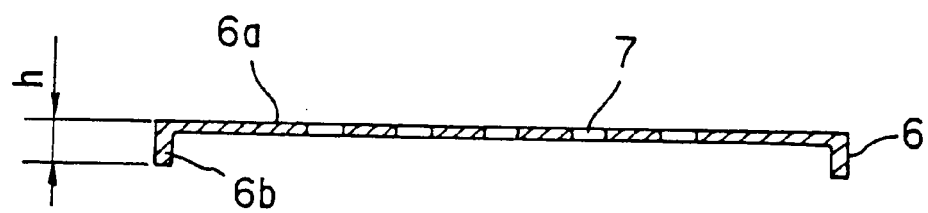
Figure 5:
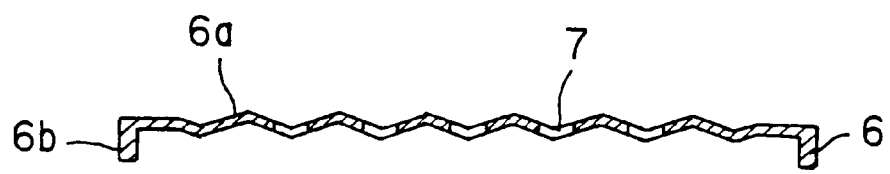
FIG. 5 is a cross-sectional view showing an embodiment of a fin plate.
Figure 6:
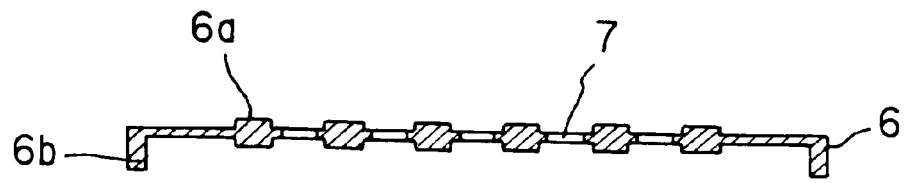
FIG. 6 is a cross-sectional view showing an embodiment of a fin plate.
Figure 7:
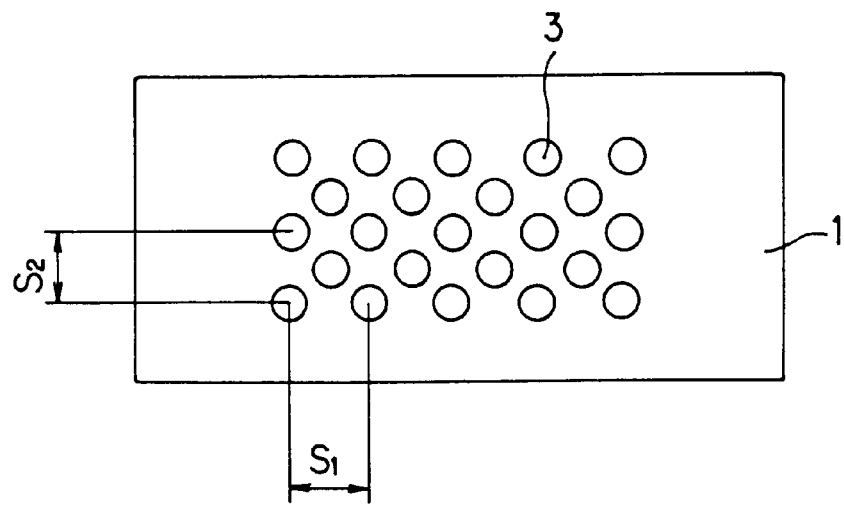
FIG. 7 is a plan view showing an embodiment of a tubular plate.
Figure 8:
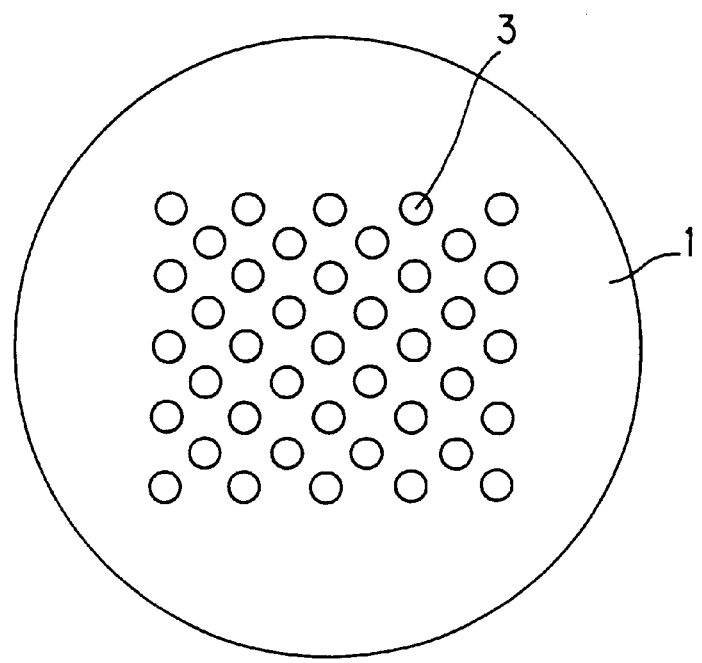
FIG. 8 is a plan view showing an embodiment of a tubular plate.
Figure 9:
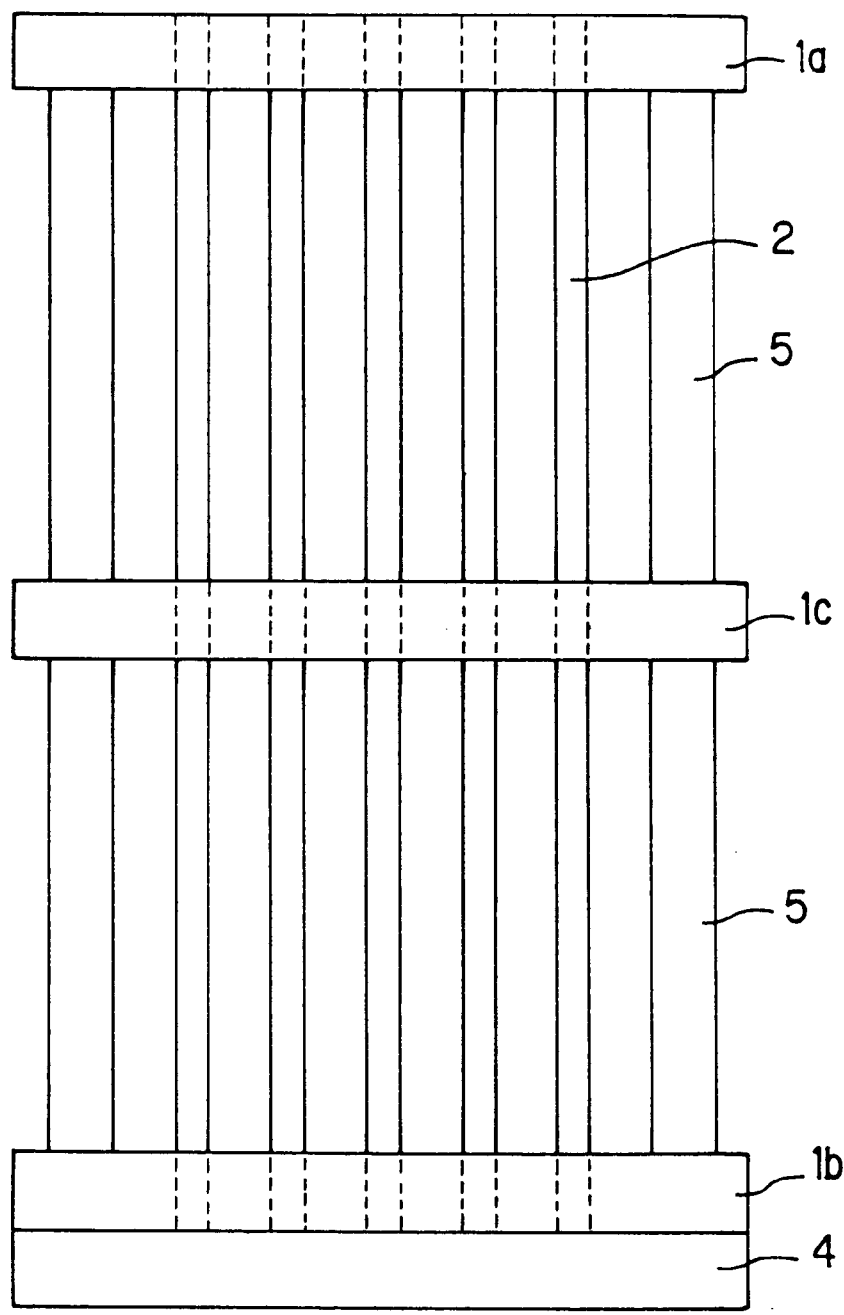
FIG. 9 is an illustrative side view showing a method for manufacturing a ceramic shell-and-tube type heat exchanger disclosed in U.S. patent application Ser. No. 08/411,261.

Incidentally, the tubular plates and the fin plates do not have to have a rectangular shape as a tubular plate 1 in FIG. 7 and a fin plate 6 in FIG. 3 and may be another shape. For example, FIG. 8 is a plan view showing a circular tubular plate 1. A fin plate 6 may have a corrugated thin plate 6a or a thin plate 6a having protrusions and depressions as shown in FIG. 5 or 6 so as to enlarge a heat transfer area. Further, the thin plate 6a for supporting heat transfer tubes may have a slit or the like besides throughholes 7 into which heat transfer tubes 2 are to be inserted.

A protrusion of a fin plate may be formed on all of the periphery of the thin plates. Alternatively, the protrusion may be formed on a part of a periphery of the thin plates as long as a predetermined space is ensured between the surfaces of adjoining fin plates when fin plates are piled up. For example, the rectangular fin plate 6 shown in FIG. 3 has protrusions 6b formed on the two facing sides.

Firing is performed under a condition shown in FIG. 1 so as to unitarily join heat transfer tubes 2, tubular plates 1a, 1b, and fin plates 6. Then, protrusions 6b are removed from fin plates 6. The protrusions 6b can be removed by surface grinding when the fin plates are rectangular and by cylindrical grinding when the fin plates are circular. Incidentally, peripheral portions of tubular plates 1a and 1b may be subjected to grinding processing simultaneously with the removal of the protrusions 6b so that the tubular plates 1a and 1b have the same configuration and dimensions as the fin plates which protrusions 6b are removed.

Figure 2:
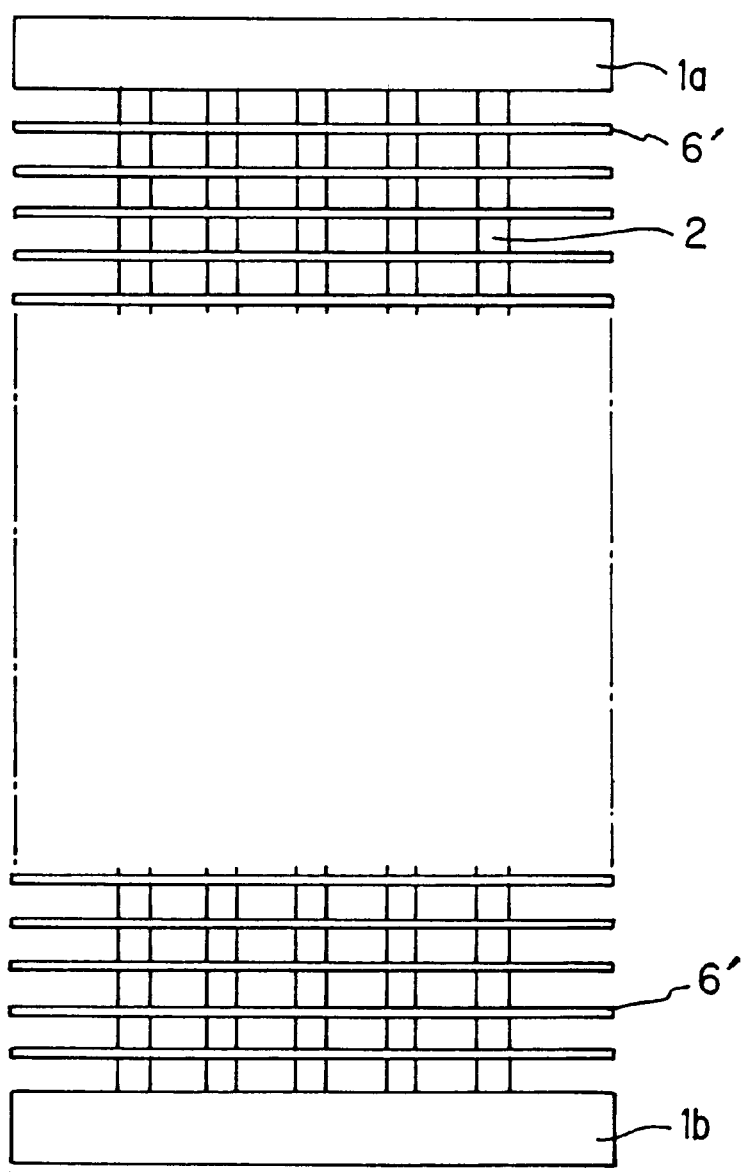
FIG. 2 is a schematic side view showing one embodiment of the ceramic shell-and-tube type heat exchanger obtained by a manufacturing method of the present invention.

As shown in FIG. 2, thus obtained heat exchanger has a plurality of parallel heat transfer tubes 2, two tubular plates 1a and 1b which are fixed on both end of the heat transfer tubes 2, thin plate-like fins 6' (which are obtained by removing protrusions 6b from the fin plate 6), which are jointed and fixed to the heat transfer tubes 2. This heat exchanger has an enlarged heat transfer area outside the heat transfer tubes 2 because of the fins 6', and as a result heat-exchanging quantity is increased and high heat-exchanging efficiency can be obtained as a whole.

A ceramic to be used for the present invention is not particularly limited. However, silicon nitride or silicon carbide are preferably used because they have high strength and high thermal resistance. Tubular plates, fin plates, and heat transfer tubes may be made of one kind of ceramic material. Alternatively, they each may be made of independent materials. For example, when tubular plates and heat transfer tubes are made of silicon nitride, fin plates may be made of aluminum nitride, which has a heat conductivity higher than that of silicon nitride. The number and disposition of the throughholes arranged in the tubular plates and the fin plates are not particularly limited and may be selected depending on conditions for use of the heat exchanger. The throughholes may be arranged when plate-like bodies for the tubular plates or the fin plates are molded. Alternatively, the throughholes may be arranged by means of punching, ultrasonic machining, or the like after molding.

The present invention is hereinbelow described in more detail on the basis of Example. However, the present invention is by no means limited to the Example.

EXAMPLE

To 1000 g of $Si_3N_4$ powder were added 10 g of $Y_2O_3$, 10 g of MgO, and 5 g of $ZrO_2$ as sintering aids, 1 g of poly(vinyl alcohol) as an organic binder, and 1000 g of water. They were ground and mixed for 4 hours by an attriter using a $Si_3N_4$ ball having a diameter of 5 mm so as to obtain a mixture. The mixture was then dried and granulated by a spray drier so as to obtain a powder as a material. A cylindrical compact was made by extrusion molding using the powder and dried at 110° C. for 10 hours. Subsequently, the compact was calcined so as to remove the binder at 500° C. for 5 hours, and then fired at 1650° C. for 1 hour so as to obtain a sintered heat transfer tube having an outer diameter of 7 mm, an inner diameter of 5 mm, and a length of 1050 mm.

The same material as that of the aforementioned heat transfer tube was subjected to isostatic pressing under a pressure of 7 ton/cm² so as to obtain a compact having a plate-like shape. The compact was dried and calcined so as to remove a binder in the same manner as in the production of the aforementioned heat transfer tube, and then calcined at 1350° C. for 3 hours in a nitrogen atmosphere. The obtained calcined body having dimensions of 300×150×25 mm was subjected to ultrasonic machining so as to form a plurality of throughholes which the cylindrical bodies are to be inserted into and joined to the calcined body, each of throughholes having a diameter of 7.1 mm. Thus, a calcined tubular plate was obtained. Incidentally, the throughholes were arranged in a zigzag as shown in FIG. 7 ($S_1$=9.8 mm, $S_2$=9.1 mm).

A calcined fin plate was obtained in the same manner as in the aforementioned production of the tubular plate. The fin plate had a surface for supporting heat transfer tubes, protrusions, and throughholes. The surface had dimensions of 350×150×1 mm. The protrusions had a height of 5 mm. The throughholes were disposed in the same way as in the tubular plate.

Then, as shown in FIG. 1, the heat transfer tubes 2 were inserted into the throughholes of the tubular plates 1a and 1b and fin plates 6. The tubular plates 1a and 1b were positioned at both upper and lower ends of the heat transfer tubes 2 on a setter 4. Simultaneously, 199 fin plates 6 were piled up between the tubular plates 1a and 1b so as to being disposed in the direction of the length of the heat transfer tubes 2. Incidentally, spacers 8 each having a height of 5 mm were inserted into the space between the uppermost fin plate 6 and the tubular plate 1a so as to ensure the space there.

Under such conditions, they were fired at 1650° C. for 3 hours in a nitrogen atmosphere so as to unitarily join heat transfer tubes 2, tubular plates 1a and 1b, and fin plates 6. Then, protrusions 6b of the fin plates 6 and the peripheral portions of the tubular plates 1a and 1b were removed by surface grinding. Thus, there was obtained a shell-and-tube type heat exchanger provided with fins, in which two tubular plates 1a and 1b were joined and fixed at both ends of each of a plurality of heat transfer tubes 2 arranged in parallel and fins 6' were joined and fixed to the heat transfer tubes 2 between the tubular plates 1a and 1b. Incidentally, an interference of the firing join was 0.2 mm.

COMPARATIVE EXAMPLE

Figure 10:
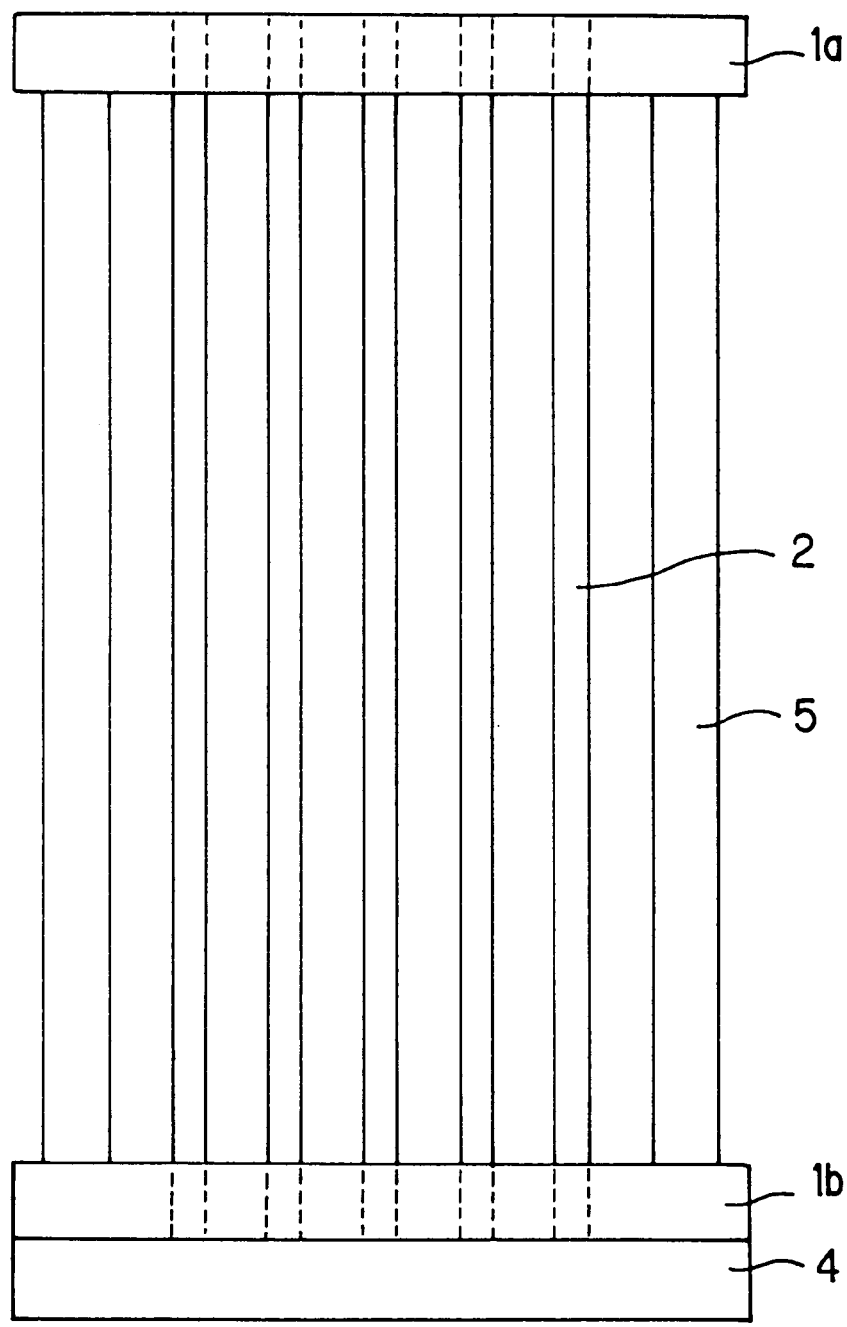
FIG. 10 is an illustrative side view showing a conventional, general method for manufacturing a ceramic shell-and-tube type heat exchanger.
Figure 11:
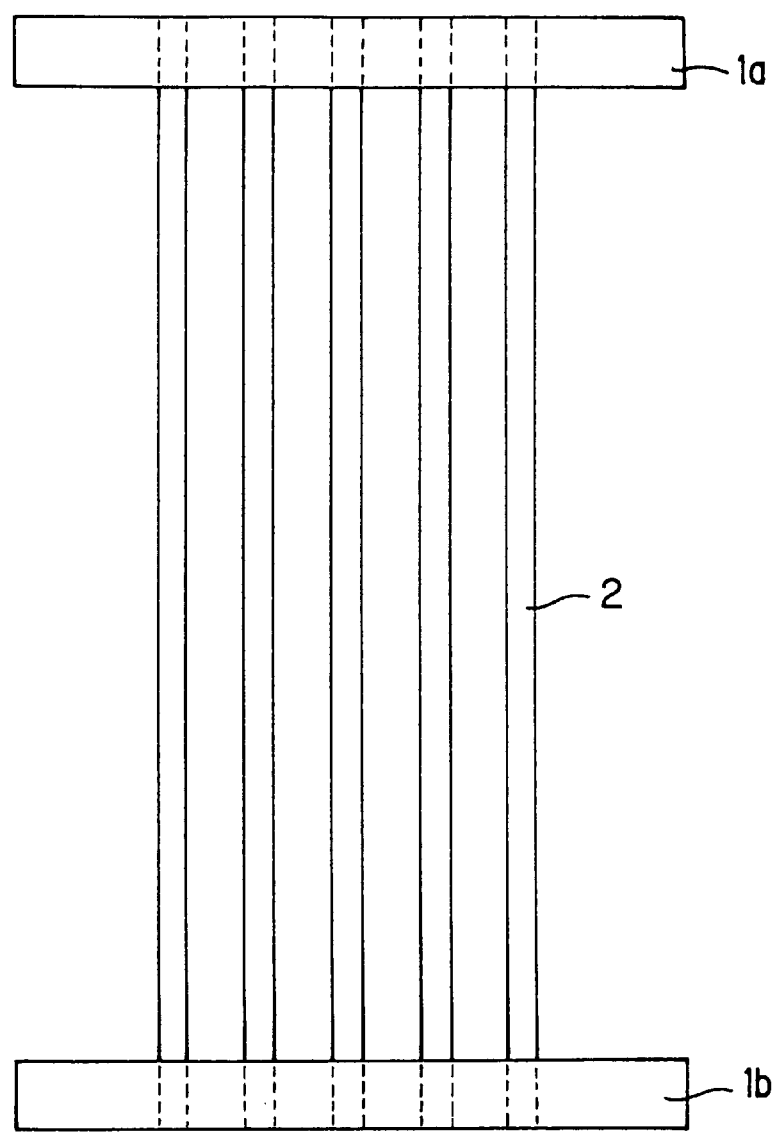
FIG. 11 is a schematic side view showing a ceramic shell-and tube type heat exchanger manufactured by a conventional method.

A shell-and-tube type heat exchanger was obtained in the same manner as in the Example except that fin plates were not used and jigs 5 were used between the tubular plates 1a and 1b as shown in FIG. 10. As shown in FIG. 11, tubular plates 1a and 1b are unitarily joined at both upper and lower ends of the heat transfer tubes 2 in the shell-and-tube type heat exchanger.

Heat transfer tubes of each of the heat exchangers obtained in the Example and Comparative Example were measured for deformation (straightness). Heat transfer tubes of the heat exchanger which did not use fin plates and was obtained in the Comparative Example had a deformation of about 3 mm, while heat transfer tubes of the heat exchanger which used fin plates and was obtained in the Example had a deformation of about 1 mm. Thus, a deformation of heat transfer tubes with fins was controlled to a great degree in comparison with that of heat transfer tubes without fins.

Each of the heat exchangers obtained in the Example and Comparative Example was measured for heat transfer rate outside the heat transfer tubes as follows:

As a fluid outside the tubes, air having an inlet temperature of 900° C. was sent from the direction perpendicular to the direction of length of heat transfer tubes towards the heat transfer tubes with a speed of 9 kg/m²·sec. As a fluid inside the heat transfer tubes, air having an inlet temperature of 500° C. was sent inside the tubes with a speed of 90 kg/m²·sec. Thus, a heat transfer rate outside the heat transfer tubes was obtained. As a result, the heat exchanger without fins obtained in the Comparative Example had a heat transfer rate of 208 kcal/m² hr° C., while the heat exchanger with fins obtained in the Example had a heat transfer rate of 296 kcal/m² hr° C., which is a 42% improvement of heat transfer rate in comparison with that of the Comparative Example.

As described above, according to a method for producing a shell-and-tube type heat exchanger provided with fins, deformation of heat transfer tubes in a process of firing join can be effectively controlled by piling up many fin plates in the direction of the length of the heat transfer tubes between a tubular plate positioned at the upper end of the heat transfer tubes and a tubular plate positioned at the lower end of the heat transfer tubes. Further, a jig for positioning tubular plates is not necessary upon firing join because the tubular plates are supported by fin plates and can be positioned in a predetermined place. Furthermore, fin plates function as fins for enlarging a heat transfer area outside heat transfer tubes by removing the protrusions after firing join.

In a ceramic shell-and-tube type heat exchanger provided with fins of the present invention, a heat transfer area outside the heat transfer tubes is enlarged by many fins joined and fixed to the heat transfer tubes, and as a result, heat transfer rate outside the tubes is improved, and high heat-exchanging efficiency is obtained.

What is claimed is:

1. A method for manufacturing a ceramic shell-and tube type heat exchanger provided with fins, comprising the steps of:

inserting heat transfer tubes of sintered tubular ceramic into throughholes of tubular plates of unsintered plate-like ceramic each having a plurality of throughholes for fixing the heat transfer tubes inserted thereinto;

standing the heat transfer tubes vertically to a floor surface;

positioning the tubular plates at both the upper and lower end portions of the heat transfer tubes;

disposing between the tubular plates a plurality of fin plates of unsintered ceramic so as to pile up the fin plates in the direction of a length of the heat transfer tubes, each of the fin plates comprising: a thin plate having a plurality of throughholes for fixing the heat transfer tubes inserted thereinto, and protrusions formed on edge portions of the thin plate and extending upwardly or downwardly so as to separate the thin plates;

firing a resultant structure so as to unitarily join the structure by utilization of diferences of firing shrinkage ratios among the heat transfer tubes, the tubular plates, and the fin plates; and removing the protrusions from the fin plates.

2. A method for manufacturing a ceramic shell-and-tube type heat exchanger according to claim 1, wherein a thickness of the thin plate is 0.5 to 3 mm.

3. A method for manufacturing a ceramic shell-and-tube type heat exchanger according to claim 1, wherein spacers are positioned between the uppermost fin plate and the upper tubular plate so as to secure a predetermined space therebetween.

4. A method for manufacturing a ceramic shell-and-tube type heat exchanger according to claim 1, wherein the uppermost fin plate has protrusions in both the upper and lower direction.

5. A method for manufacturing a ceramic shell-and-tube type heat exchanger according to claim 1, wherein the fin plate is a corrugated thin plate.

6. A method for manufacturing a ceramic shell-and-tube type heat exchanger according to claim 1, wherein the fin plate is a thin plate having protrusions and depressions.

* * * * *